United States Patent
Perry

(10) Patent No.: US 10,420,012 B2
(45) Date of Patent: Sep. 17, 2019

(54) ADAPTIVE UNICAST TIMEOUT FOR A WIRELESS NETWORK HAVING OPTIMIZED ROUTING

(71) Applicant: Joshua Perry, Sandy, UT (US)

(72) Inventor: Joshua Perry, Sandy, UT (US)

(73) Assignee: PRODATAKEY, INC., South Jordan, UT (US)

( * ) Notice: Subject to any disclaimer, the term of this patent is extended or adjusted under 35 U.S.C. 154(b) by 0 days.

(21) Appl. No.: 15/265,699

(22) Filed: Sep. 14, 2016

(65) Prior Publication Data

US 2017/0078946 A1    Mar. 16, 2017

Related U.S. Application Data

(60) Provisional application No. 62/218,190, filed on Sep. 14, 2015.

(51) Int. Cl.
| | | |
|---|---|---|
| *H04L 1/18* | (2006.01) | |
| *H04W 40/24* | (2009.01) | |
| *H04L 12/26* | (2006.01) | |
| *H04L 12/925* | (2013.01) | |
| *H04W 24/02* | (2009.01) | |
| *H04W 40/12* | (2009.01) | |
| *H04L 12/707* | (2013.01) | |

(52) U.S. Cl.
CPC ......... *H04W 40/248* (2013.01); *H04L 1/1848* (2013.01); *H04L 43/0852* (2013.01); *H04L 45/22* (2013.01); *H04L 47/722* (2013.01); *H04W 24/02* (2013.01); *H04W 40/12* (2013.01)

(58) Field of Classification Search
CPC ... H04W 40/248; H04W 24/02; H04W 40/12; H04L 1/848; H04L 43/0852; H04L 47/722; H04L 1/1848

USPC ......................................................... 370/237
See application file for complete search history.

(56) References Cited

U.S. PATENT DOCUMENTS

| | | | | |
|---|---|---|---|---|
| 5,570,367 | A * | 10/1996 | Ayanoglu | H04L 1/1607 370/346 |
| 6,473,399 | B1 * | 10/2002 | Johansson | H04L 1/0002 370/229 |
| 7,848,287 | B2 * | 12/2010 | Diachina | H04L 1/1838 370/252 |
| 2002/0013856 | A1 * | 1/2002 | Garcia-Luna-Aceves | H04L 45/02 709/238 |

(Continued)

*Primary Examiner* — Kevin D Mew
(74) *Attorney, Agent, or Firm* — Morriss O'Bryant Compagni Cannon, PLLC

(57) ABSTRACT

A system and method for optimizing performance of a network by creating a database of the time that a packet takes to be transmitted from one node to a next adjacent node, and uses that database to calculate a new default Unicast timeout period, wherein if an acknowledgement is not received from a destination node within the default Unicast timeout period, then the packet may be retransmitted in a period of time that is optimized and not dependent on waiting for a standard Unicast timeout period to expire, and wherein a system and method also includes replacing the use of broadcast messages to learn the status of nodes on a network by creating a self-forming and self-correcting dynamic network by compiling a database of all known paths through a network, rating all known paths so that if the best route is blocked, the next best route can be substituted for it to enable a date packet to have the fastest path back to a source.

5 Claims, 4 Drawing Sheets

(56) References Cited

U.S. PATENT DOCUMENTS

| | | | | |
|---|---|---|---|---|
| 2003/0123403 | A1* | 7/2003 | Jiang | H04L 1/1841 370/328 |
| 2003/0123481 | A1* | 7/2003 | Neale | H04B 7/18582 370/466 |
| 2004/0219909 | A1* | 11/2004 | Kennedy | H04L 45/14 455/422.1 |
| 2005/0180356 | A1* | 8/2005 | Gillies | H04W 40/02 370/329 |
| 2005/0243831 | A1* | 11/2005 | Zhang | H04L 1/1812 370/394 |
| 2005/0276266 | A1* | 12/2005 | Terry | H04L 1/0003 370/394 |
| 2005/0281243 | A1* | 12/2005 | Horn | H04L 1/1803 370/345 |
| 2007/0025388 | A1* | 2/2007 | Abhishek | H04L 1/188 370/447 |
| 2007/0053299 | A1* | 3/2007 | Khan | H04L 41/00 370/238 |
| 2007/0079207 | A1* | 4/2007 | Seidel | H04L 1/1845 714/748 |
| 2007/0168826 | A1* | 7/2007 | Terry | H04L 1/1812 714/748 |
| 2009/0049356 | A1* | 2/2009 | Lin | H04L 1/0025 714/749 |
| 2012/0089892 | A1* | 4/2012 | Kang | H04L 1/188 714/799 |
| 2016/0219458 | A1* | 7/2016 | Kubota | H04W 28/06 |

* cited by examiner

ADAPTIVE UNICAST TIMEOUT FOR A WIRELESS NETWORK HAVING OPTIMIZED ROUTING

BACKGROUND OF THE INVENTION

Field of the Invention

This invention relates generally to wireless networks. Specifically, the invention pertains to two systems and methods for optimizing performance of a wireless network. The first embodiment eliminates the use of a default Unicast timeout for packet transmission by storing a history of travel time between nodes to thus generate an expected travel time, and if acknowledgement of arrival of the packet at the destination node is not received within the expected travel time, then retransmission of the packet can toe executed without having to wait for the default Unicast timeout period to expire.

In a second embodiment, the system of using broadcast messages to learn the status of nodes is eliminated and replaced with a system of storing all possible routes that a packet can take from a source node to a destination node. By storing all possible routes, when a particular route becomes disabled for whatever reason, the next most optimum route is already stored in memory and the packet can be resent along the known new route. This system of the second embodiment may also inhibit route flapping by using the stored routes instead of relying on routes that may vary in speed because of temporary external factors. The routes are prioritized by analyzing the stored history to select the optical route.

BRIEF SUMMARY OF THE INVENTION

The first embodiment is a system and method for optimizing performance of a network by creating a database of the time that a packet takes to be transmitted from one node to a next adjacent node, and uses that database to calculate a new default Unicast timeout period, wherein if an acknowledgement is not received from a destination node within the default Unicast timeout period, then the packet may be retransmitted in a period of time that is optimized and not dependent on waiting for a standard Unicast timeout period to expire, and wherein a system and method also includes replacing the use of broadcast messages to learn the status of nodes on a network by creating a self-forming and self-correcting dynamic network by compiling a database of all known paths through a network, rating ail known paths so that if the best route is blocked, the next best route can be substituted for it to enable a data packet to have the fastest path back to a source.

DETAILED DESCRIPTION

Reference will now be made to the drawings in which the various embodiments will be given numerical designations and in which the embodiments will be discussed so as to enable one skilled in the art to make and use the embodiments of the disclosure. It is to be understood that the following description illustrates embodiments of the present disclosure, and should not be viewed as narrowing the claims which follow.

This invention relates generally to a wireless network. A wireless network may be comprised of a plurality of network nodes that may communicate with one or more other network nodes using wireless transmission technology. Consider the wireless network shown in FIG. 1.

Figure 1:
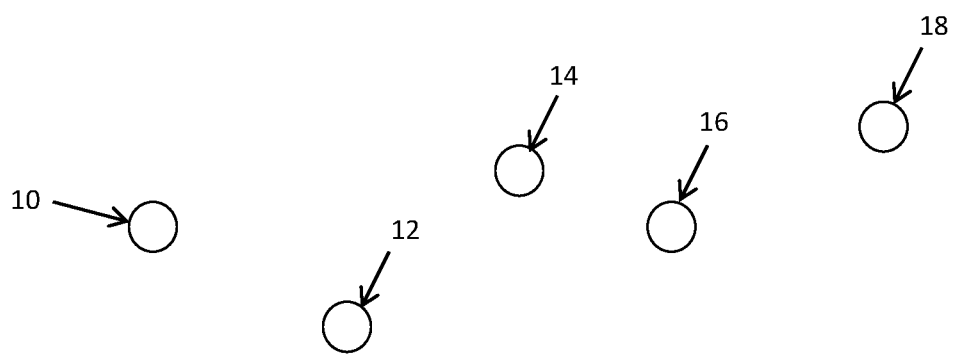
FIG. 1 is an illustration of a prior art system illustrating a first topology of nodes.

FIG. 1 shows a wireless network having a plurality of network nodes, or nodes. The most direct or optimal path from a source node 10 to a destination node 18 is for a packet to travel from node 10 to node 12, from node 12 to node 14, from node 14 to node 16, and finally from node 16 to node 18. The distance between nodes should not be considered to be to scale, but is for illustration purposes only.

A first problem that may arise with transmission of a data packet is that the data packet may never arrive at the destination node 18. There are many reasons that the data packet may not arrive such as interference of transmission between two nodes along the path, failure of a node, etc.

The specific reason for failure of the network to transmit the first data packet is not relevant to the invention. What is important to understand is that in the prior art, the network may not be capable of sending another data packet until it is known if the first data packet has arrived at the desired destination. A wireless network may send some sort of acknowledgement signal from the destination node to the source node such as an Application Layer acknowledgement signal that the first data packet has arrived.

Another issue that is helpful to understand is the use of a Unicast transmission. A Unicast transmission may be the transmission of a data packet to a single node that may be identified by a unique network address. This distinguishes the Unicast transmission from a broadcast transmission that transmits to all nodes.

A wireless network may have a Unicast timeout feature. When a source node transmits to a destination node using a Unicast transmission, there is a default Unicast timeout period or transmission time. The default Unicast timeout period may be defined as the maximum time that the network will wait to receive acknowledgement from a destination node that the data packet was successfully transmitted. This may be referred to as a MAC layer relay acknowledgement. The important consideration is that the network will not be transmitting data at all until it either receives acknowledgement that the packet arrived at the destination node, or the default Unicast timeout period has elapsed.

The first embodiment of the invention is directed to increasing network throughput. In other words, if the network is waiting to receive confirmation that a packet was successfully or unsuccessfully transmitted, anything that can be done to shorten the time for the network to receive confirmation may result in an increase in data transmission through the network.

The first embodiment of the invention may be to shorten the default Unicast timeout period to the shortest time possible so that the network is waiting the least amount of time that is necessary before another attempt is made to transmit a packet. It should be understood that it does not matter if the last packet was successfully transmitted or not. The network will not be able to transmit the original first data packet or a new data packet until confirmation is received or the default Unicast timeout period has expired.

If a data packet is being transmitted between adjacent nodes, then the Unicast timeout period is only one Unicast timeout period. However, if the data packet is being transmitted between node that are not adjacent, the data packet may have to hop through one or more intervening nodes before it arrives at a destination node. The Unicast timeout period may be cumulative for each of the node hops.

For example, if a data packet will make four hops to travel from a source node to a destination node, the Unicast timeout may be the sum of four default Unicast timeout periods. The default Unicast timeout period may be long relative to the actual time that the data packet needs in order to travel along the four nodes. Nevertheless, if the data packet does not arrive for any reason, the network may be unable to transmit any more data packets until the total Unicast timeout period has elapsed. Therefore, a network that has interference or failed nodes that result in many packet retransmissions, the network may be a slow network.

It would be an advantage over the prior art to be able to adjust the default Unicast timeout period in order to increase network throughput and enable faster retransmission of failed packets or transmission of new packets. For example, it may be possible to determine an actual longest transmission time between particular nodes and then use this actual transmission time as the value for one of the hops when determining the total Unicast timeout period. In other words, it may be possible to compile a history of actual travel times between nodes and then use this history of performance of the network in order to select a reasonable value for the default Unicast timeout period. Thus, the first embodiment may calculate a median value or median transmission time value of travel time between all adjacent nodes, add some nominal buffer amount to the median value and then use this median value as the new default Unicast timeout period.

It should be understood that using a median transmission time value may not be the only method for selecting the new default Unicast timeout period. Therefore, any method that enables the selection of a shorter default Unicast timeout period than the prior art may be selected. For example, it may be known that a particular path for a data packet may have one or more adjacent nodes that are substantially greater apart than the distance between other nodes in the network. Therefore, an adjustment factor or buffer time may be added to a default Unicast timeout period if the path that a packet is travelling is known to be a path that has one or more of these adjacent nodes that have longer transmission times than the calculated median value.

The first embodiment may begin by using the default Unicast timeout period that might be used in the prior art for a new network. However, over a period of time as data is collected on actual performance of the network, the default Unicast timeout period may be adjusted to be a shorter length using the history of the network to calculate a new median transmission time value.

Accordingly, the method of the first embodiment of the invention may be to first, define a first default Unicast timeout period. The first default Unicast timeout period may be any period that will enable the network to function, and may be longer than necessary, or be a default value previously programmed into a network. The next step may foe to record the transmission time between adjacent nodes in a database. The number of records that are kept for recording the transmission time between adjacent nodes may be any desired number, but sufficient to provide a usable sample of transmission times in order to calculate a median transmission time value.

The database must also have sufficient space to record transmission times for all of the adjacent nodes. It may be assumed that the memory is large enough to also record transmission times for a larger network and not just the existing number of nodes in the network that is being optimized.

Figure 2:
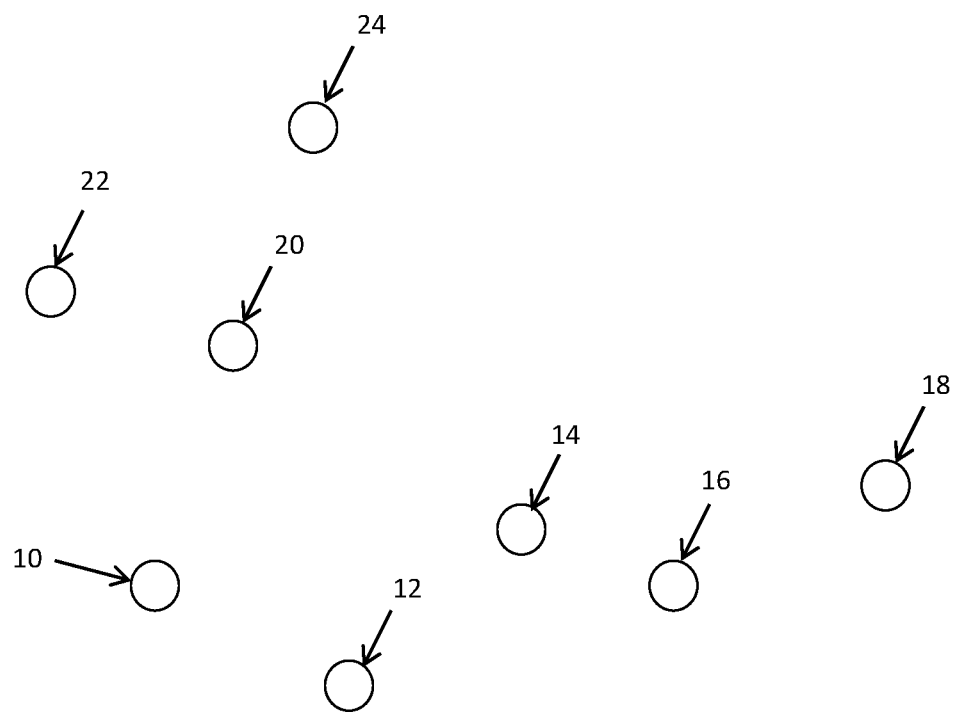
FIG. 2 is an illustration of a network topology that illustrates the various embodiments of the invention.

Once a sufficient number of transmission times between adjacent nodes has been recorded, the first embodiment may calculate a new default Unicast timeout period. For example, consider a network of eight nodes as shown in FIG. 2. The database would record the transmission times of a data packet between at least the following adjacent nodes (but maybe more): (10,20), (10,22), (22,24), (20,24), (20,22), (10,12), (12,14), (14,16), (16,18). It should also be recognized, that if certain nodes are removed from the network, other nodes that may not appear to be adjacent may actually become the tee closest nodes. Accordingly, the list or adjacent nodes may be expanded to include each node adjacent to every other node. In this situation, it may be apparent that nodes in such a listing may never transmit a packet directly between them.

For example, it may be unlikely or impossible for a data packet to be transmitted from node 18 to 22. It may be impossible or unlikely because of the physical distance between the nodes, or some physical barrier that may prevent such a transmission. Nevertheless, it may be necessary to expand the database to at least include a possible entry for every node pair in the network, even if it is not practical or possible for a data transmission to occur between them.

When making the calculation to determine the median transmission time value, some node pairs may not be included. Therefore, it may be that only those node pairs that have actually completed a predetermined number of actual data transmissions between them will be included in the calculation.

The step of calculating the median transmission time value may be done in any way that will select an acceptable default Unicast timeout period. This may include but should not be considered to be limited to: calculating a mean for each node pair to be considered in the calculation, then determining the median value from all of tee node pair means, or not calculating a mean but simply using ail of the transmission times from ail of the node pairs to be considered, and then determining the median value, or any similar method that uses at least two transmissions times for each node pair to be used in the calculation for determining the new default Unicast timeout period.

The last step may be to add a buffer time period to the new default Unicast timeout period. The buffer time may or may not be needed. It may need to be added if the new default Unicast timeout period is determined to be too short. This buffer time may be lengthened or shortened until the network performance improves.

In an alternative embodiment of the invention, it may be necessary to adjust or recalculate the default Unicast timeout period if a new source of interference is detected that is substantially affecting reliability of the network. Accordingly, it may be necessary to discard some older data to reflect the new operating conditions of a network that is experiencing a new source of interference.

Figure 3:
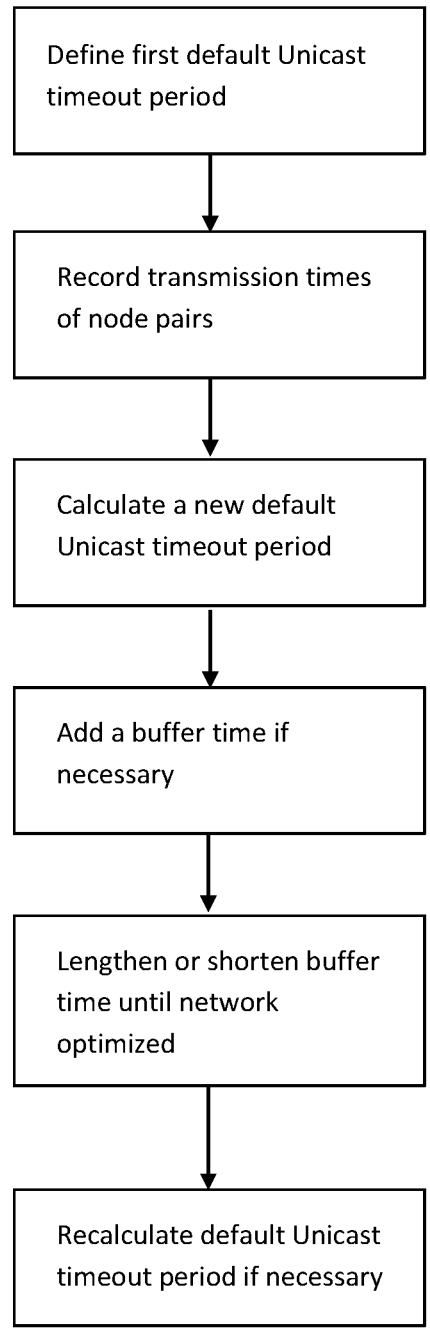
FIG. 3 is a flow chart of the system and method of the first embodiment.
Figure 4:
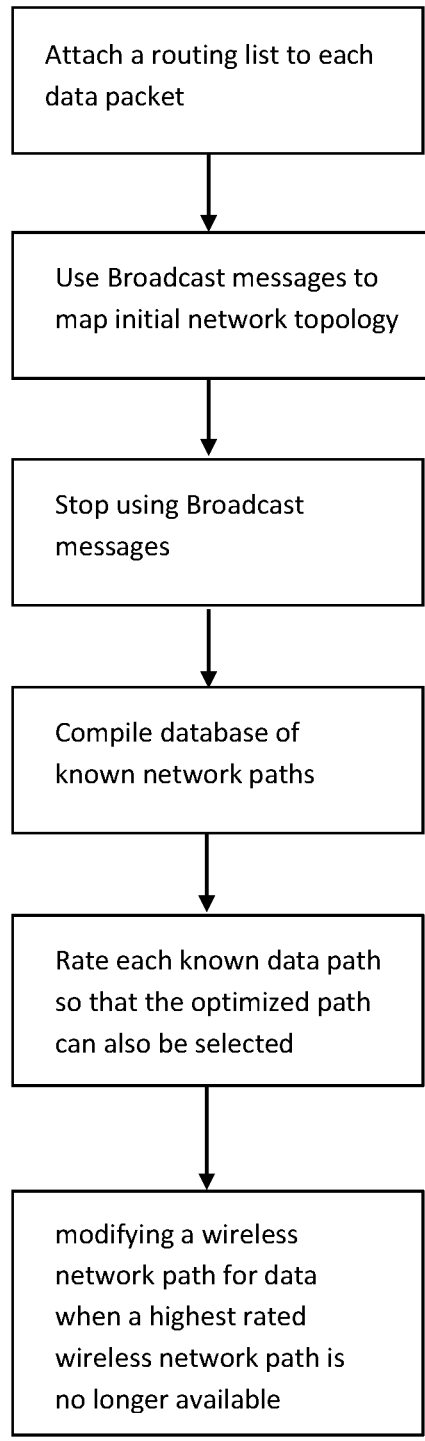
FIG. 4 is a flow chart of the system and method of the second embodiment.

FIG. 3 is a summary of the method of the first embodiment of the invention. The first step may be to define a first default Unicast timeout period. The next step may be to record data transmission times for adjacent pairs of nodes. The next step may be to calculate a new default Unicast timeout period. The next step may be to add a buffer time to the new default Unicast timeout period if network performance is not optimized. The next step may be to lengthen or shorten the buffer time until network performance is optimized. The final step may be to recalculate the new default Unicast timeout period, for example, if nodes disappear or there is a new source of interference with the network.

It should be understood that the storage of the database of node pairs and transmission times and calculation of a default Unicast timeout period may be performed by any appropriate network hardware such as a network router, a network switch or any other similar network device.

A second problem when trying to optimize performance of a network is directed to the aspect of aggregate routing. Network route aggregation may be defined as the optimization of network routing. One reason that networks may be slow is because of route flapping. Route flapping occurs when a network keeps changing a path that is used to transmit data between a source and destination node. There may be different reasons for the path to change.

For example, a network may use Broadcast transmissions to confirm network paths. These network paths may change because a particular node may experience interference that is intermittent. Thus, when a first Broadcast transmission is sent out a first node may not experience interference and so a path for data may travel through the first node. However, in a subsequent Broadcast transmission, the first node may not be usable and so a new path is selected that travels around the first node. If the first node is available intermittently, then the network may switch back and forth between using the first node in a path and not using it, and thus resulting in route flapping.

The method for optimizing wireless network performance by reducing wait time between retransmission of data packets may comprise the steps of providing a wireless network having a plurality of wireless network nodes, using a first default Unicast timeout period that is used by the wireless network as the maximum period of time to wait for acknowledgement that a data packet has reached a destination node before retransmitting the data packet, recording transmission times for each node pair in the wireless network, and calculating a new default Unicast timeout period using the transmission times recorded for each node pair.

In a second embodiment of the invention, it may be possible to attach a routing list to a packet which gives a specific path of nodes to follow from a source node to a destination node. For example, the routing list may be disposed within a header of each data packet. However, it a node along the path becomes unusable, then a return path to the source node is gone. In the prior art, the network may reconfigure itself by sending a Broadcast every few minutes in order to rebuild paths around nodes that are no longer responding in the network.

There may be several performance tradeoffs caused by using Broadcast messages. For example, there may be a lot of extra traffic on the network as the network blindly sends out Broadcast transmissions every few minutes to locate dead paths. Furthermore, for networks that may be considered as healthy and having little interference or dead nodes, networks can still suffer from route flapping.

Thus in a second embodiment of the invention, a history or database may be compiled of known paths through the network. This history may be used to place a rating or ranking on different paths through the network. The rating of the paths may be based upon the time for data to travel each path, the availability of each path, and any ether criteria that may be useful in rating the network paths.

The history may be stored on a central Aggregator or Coordinator (hereinafter the "Aggregator"), or the Aggregator may be connected to a storage device with a fast processor. Using a central storage device eliminates the need for each node to store all of the data regarding path history.

A function of the third embodiment is to be able to provide information to any node as to which path to take back to the Aggregator. This function, may be performed by compiling a history of possible paths to use if paths disappear or are otherwise not available. This process of selecting a path to follow may be repeated by trying different paths until a working path is found. This process may eliminate or reduce the need for the use of Broadcast messages.

Alternatively, Broadcast messages may be used when the network is new in order to create or establish an initial path between nodes, but then stop using Broadcast messages once a history or database of alternate paths begins to grow.

For example FIG. 2 shows that a shortest and for this example, a highest ranked path between the source node 10 and a destination node 24 is to hop through node 20. If node 20 were to disappear from the network or be unavailable, a new route would need to be used.

A compiled history of paths between node 10 to 24 may include the path of node 10 to node 22 to node 24. The compiled history may rank the paths based on distance, speed, or other criteria including a combination of criteria. If the path of node 10 to node 20 to node 24 were ranked first but were to disappear, then the second embodiment provides a next higher ranked path which may be the path from node 10 to node 22 to node 24.

In another aspect of the second embodiment, it may be possible to query the network to determine the quality of a link between any two nodes.

The second embodiment may also reduce route flapping and eliminate the need to regularly re-learn the topology of a network by repeatedly using broadcast messages that use network resources and cause the network to slow down or be less responsive to network traffic.

The purpose of the second embodiment is to obtain a dynamic network that is both self-forming and then self-correcting when there is interference with nodes that disrupts network traffic. It would be an advantage to have a semi-static network that is optimally routed.

The steps of the second embodiment of the invention may be listed as follows. First, a route list may be added to each data packet that provides a path from a destination node back to a source node. The next step may be to use Broadcast messages to determine an initial network topology of known data paths between nodes. The next step may be to discontinue the use of Broadcast messages and continue to compile a history of known data paths through the network. The next step may be to rate each of the known paths through the network and to store the rating with each data path.

The method for providing a dynamic wireless network that may make corrections in wireless network paths to optimize data transmission times may take the steps of providing a wireless network having a plurality of wireless network nodes, attaching a routing list to each data packet so that each data packet has a path back from a destination node to a source node, using at least one Broadcast message to initially determine a wireless network topology, compiling a database of known wireless network paths between the wireless network nodes, storing a quality rating with each of the known wireless network paths stored in the database, modifying a wireless network path for data when a highest rated wireless network path is no longer available, and retransmitting the data packet using the next highest rated path.

Although the preceding description has been described herein with reference to particular means, materials, and embodiments, it is not intended to be limited to the particulars disclosed herein; rather, it extends to all functionally equivalent structures, methods, and uses, such as are within the scope of the disclosure. Accordingly, all such modifications are intended to be included within the scope of this disclosure. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for optimizing wireless network performance by reducing wait time between retransmission of data packets, said method comprising:
   providing a wireless network having a plurality of wireless network nodes;
   using a first default Unicast timeout period that is used by the wireless network as the maximum period of time to wait for acknowledgement that a data packet has reached a destination node before retransmitting the data packet;
   recording transmission times for each node pair in the wireless network; and
   calculating a new default Unicast timeout period using the transmission times recorded for each node pair and adding a buffer time to the new default Unicast timeout period if the wireless network is not optimized.

2. The method as defined in claim 1 wherein the method further comprises lengthening or shortening the buffer time until network performance is optimized.

3. The method as defined in claim 2 wherein the method further comprises recalculating the new default Unicast timeout period if network performance begins to degrade.

4. The method as defined in claim 1 wherein the step of calculating a new default Unicast timeout period further comprises:
   providing all of the recorded transmission times for the node pairs to be used in a calculation; and
   determining the median of all the recorded transmission times.

5. A system for optimizing wireless network performance by reducing wait time between retransmission of data packets, said system comprised of:
   a wireless network having a plurality of network nodes;
   a network device for storing network data, including a first default Unicast timeout period that is used by the wireless network as the maximum period of time to wait for acknowledgement that a data packet has reached a destination node before retransmitting the data packet;
   a network database in the network device for recording transmission times for each node pair in the wireless network; and
   a processor in the network device for calculating a new default Unicast timeout period using the transmission times recorded for each node pair and a buffer time that is added to the new default Unicast timeout period if the wireless network is not optimized.

* * * * *